United States Patent [19]
Leimgruber et al.

[11] 3,830,629
[45] Aug. 20, 1974

[54] FLUOROMETRIC ANALYSIS OF SECONDARY ALPHA-AMINO ACIDS

[75] Inventors: Willy Leimgruber, Montclair; Manfred Weigele, North Caldwell, both of N.J.

[73] Assignee: Hoffmann-La Roche Inc., Nutley, N.J.

[22] Filed: Oct. 18, 1972

[21] Appl. No.: 298,680

[52] U.S. Cl. ............................ 23/230 R, 260/583 R
[51] Int. Cl. ............................................ G01n 31/22
[58] Field of Search .................................. 23/230 R

[56] References Cited
UNITED STATES PATENTS
3,689,221    9/1972    Udenfriend ...................... 23/230 R OTHER PUBLICATIONS
Schonberg et al.; "Action of N–Bromosuccinimide & N–Bromophthalimide on α-Amino Acids" J. Chem. Soc. (London) 1951 pp. 2504–2505.

Weigele et al.; "A Novel Reagent for the Fluorometric Assay of Primary Amines" J. Am. Chem. Soc., Vol. 94, p. 5927 (1972).

*Primary Examiner*—Joseph Scovronek
*Assistant Examiner*—Arnold Turk
*Attorney, Agent, or Firm*—Samuel L. Welt, Jon S. Saxe and Alan M. Krubiner

[57]    ABSTRACT

Secondary α-amino acids are fluorometrically assayed by conversion to primary amines followed by reaction with known fluorogenic reagents and measurement of fluorescence. This technique is suitably adapted for automated analysis.

23 Claims, No Drawings

FLUOROMETRIC ANALYSIS OF SECONDARY ALPHA-AMINO ACIDS

BACKGROUND OF THE INVENTION

The qualitative and quantitative determination of amino acids has become an important method in the arsenal of the chemist and biochemist in achieving a better understanding of biological processes and, in particular, in expanding the horizons of both the diagnosis and treatment of disease. It has become standard practice in many laboratories to employ amino acid analyzers to investigate the content and distribution of amino acids in samples of proteins and polypeptides. However, until recently, the sensitivity of such amino acid analysis limited the investigator to work with relatively large samples of material.

It has recently been discovered [M. Weigele et al., J. Am. Chem. Soc., vol. 94, p. 5927 (1972); S. Udenfriend et al., Third Am. Peptide Symposium, 1972; and W. Leimgruber et al., U.S. Patent application Ser. No. 212,790, filed Dec. 27, 1971] that a new class of reagents (fluorogens) react rapidly at room temperature with primary amine-containing compounds (e.g., amino acids and peptides) to afford fluorescent products which exhibit a remarkably high degree of fluorescence, thus making possible the assay of submicromolar quantities of primary amine-containing compounds.

One major disadvantage with the above method is that secondary amino acids such as proline and 4-hydroxyproline which form part of the complement of naturally occuring amino acids do not react with the fluorogenic reagents and are hence undetectable by direct reaction with such fluorogens. This limited the usefulness of the above technique to the determination of primary amino acids in an amino acid analysis. A method that would allow for the fluorometric assay of secondary α-amino acids would be most valuable to the researcher.

BRIEF DESCRIPTION OF THE INVENTION

The present invention provides a novel method of rapidly assaying for secondary α-amino acids, particularly cyclic secondary α-amino acids such as proline and 4-hydroxyproline. The assay involves the conversion of a secondary α-amino acid to a primary amine under extremely mild conditions, for example, at about room temperature, and involves the use of reagents which may be used in excess and do not interfere with the subsequent reaction of the primary amine thus formed with fluorogenic reagents or with the assay of the fluorescent principles formed.

More particularly, the present assay method involves a procedure in which a secondary α-amino acid is converted to a primary amine by means of an oxidation-decarboxylation-hydrolysis sequence initiated by a source of active chlorine or bromine, followed by reaction of the primary amine thus produced with a fluorogen of the formula

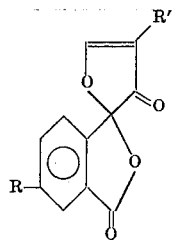

wherein R is hydrogen, halogen, lower alkyl or lower alkoxy and R' is lower alkyl or aryl, to produce a fluorescent compound, and detection of the fluorescent compound.

A degradation of secondary amino acids by treatment with various N-bromoimides has been previously reported in the literature (Schonberg et al., J. Chem. Soc. (London) 1951, p. 2504). In this publication, it was demonstrated that treatment of various acyclic secondary α-amino acids with N-bromoimides led to formation of aldehydes. In the chemical equation proposed for this conversion it was suggested that a primary amine was formed as a by-product, but there was no discussion of this point, nor was there any experimental confirmation that this was indeed the case.

The preparation of compounds of Formula I is described in co-pending U.S. Patent application Ser. No. 212,790, filed Dec. 27, 1971.

In the specification and in the appended claims, the term "lower alkyl" shall mean a monovalent, saturated, straight or branched chain hydrocarbon substituent containing up to and including eight carbon atoms; the term "lower alkoxy" shall mean a group having a lower alkyl group linked to an ether oxygen and having its free valence bond from the ether oxygen; the term "aryl" shall mean an aromatic ring system which may be substituted with one or more of the following: halogen (i.e., fluorine, chlorine, bromine or iodine), lower alkyl, lower alkoxy, nitro, cyano and so forth. Exemplary aromatic ring systems include phenyl, naphthyl, furyl, thienyl, pyrrolyl, imidazolyl, pyridyl, pyrimidinyl, indolyl, quinolyl, oxazolyl, isoxazolyl, and so forth. A particularly preferred compound of Formula I used in the assay method of the present invention is the compound where R is hydrogen and R' is phenyl.

In the first part of the present procedure, the secondary α-amino acid is degraded to a primary amine. This is initiated by a halogenation (oxidation) involving treatment of the secondary α-amino acid with a source of active chlorine or bromine. Suitable sources of active chlorine and bromine are the halogens themselves, i.e., chlorine and bromine; and N-chloro or bromo imides and amides. Examples of the latter reagents are N-chlorosuccinimide, N-bromosuccinimide, N-bromoacetamide, N-bromophthalimide, and so forth.

The halogenation reaction is carried out at a pH between about pH 1 and pH 4, most preferably at about pH 2. In this manner, the reaction occurs exceedingly rapidly under mild conditions. In fact, it is preferred to carry out the present reaction at a temperature between about 0° and +30°C., most preferably at about room temperature which makes it extremely convenient for adaptation to automated amino acid analysis.

For halogenation of cyclic secondary α-amino acids such as proline or 4-hydroxyproline, it is preferred to utilize as a source of active bromine or chlorine compounds such as N-chlorosuccinimide or N-bromosuccinimide. For halogenation of acyclic secondary α-amino acids such as sarcosine (N-methylglycine), it is preferred to utilize the halogen itself, most preferably bromine.

The halogenation reaction is preferably carried out in an aqueous medium. This is especially useful since the secondary α-amino acids from an amino acid analysis normally elute from a chromatographic column in aqueous solution. In addition, the sources of active chlorine and bromine are sufficiently water soluble to allow stock solutions to be prepared for reaction with amino acids. It is preferred to utilize an excess of chlorinating or brominating agent to ensure maximum degradation of secondary α-amino acid. An excess of from about 100 to about 1000-fold is preferred. Surprisingly, the presence of excess reagent does not interfere with the subsequent reaction and fluorescent assay.

In the oxidation-decarboxylation-hydrolysis sequence, it is believed that the first step is the N-halogenation of the secondary α-amino acid and that this is followed by loss of carbon dioxide and the halogen to afford an imine. Aqueous hydrolysis of the imine to free primary amine occurs most efficiently at about neutral and basic pH, and it is thus necessary to adjust the pH to between about 6 and 11, most preferably between about 7.5 and 9.5, in order to obtain the optimum amount of free primary amine in solution. This proposed process is illustrated below for the secondary amino acid proline.

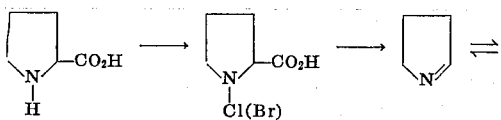

$H_2N(CH_2)_2CHO$

In this case, it can be seen that the intermediate imine is $\Delta^1$-pyrroline and that in the presence of water, this imine is in equilibrium with the corresponding α-amino aldehyde. In the case of an acyclic amino acid, reaction of the intermediate imine with water affords two separate species, an aldehyde and an amine. This is illustrated below for sarcosine, in which case methylamine and formaldehyde are formed as products.

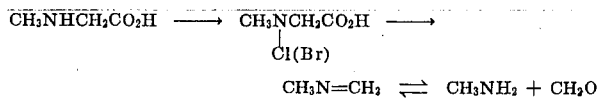

It should be noted that the above sequence of reactions also occurs with primary α-amino acids but in these cases the amine formed is ammonia. Ammonia reacts with fluorogens of Formula I to afford compounds having only a very low degree of fluorescence compared to normal primary amines. Thus, it will be appreciated that secondary α-amino acids can be assayed by the present method even in the presence of primary α-amino acids without substantial interference by the latter.

In the next step of the assay procedure, the primary amine formed from the oxidation-decarboxylation-hydrolysis sequence is reacted with a fluorogen of Formula I, most preferably the compound of Formula I wherein R is hydrogen and R' is phenyl. As is described in the references cited above relating to fluorogens of Formula I the reaction with primary amines to produce fluorescent products is most suitably carried out at a slightly basic pH. It will be appreciated that after the completion of the oxication-decarboxylation-hydrolysis sequence oxidation-decarboxylation-hydrolysis described above, the pH is already between about 6 and 11, most preferably between about 7.5 and 9.5, so that only minor, if any, adjustment of pH is necessary.

In the final step, the primary amine is reacted with an excess of the fluorogen of Formula I under conditions substantially identical to those described in the literature procedure to produce fluorescent compounds. Fluorescence of the compounds produced is measured as previously described.

Surprisingly, it has been found that the fluorescent intensity of the products produced is linearly dependent upon the concentration of starting secondary α-amino acid, and that extremely minute quantities of secondary α-amino acids can be detected and assayed by the present method. Thus, for example, concentrations of proline of between 0.1 and 1.0 nmoles/ml have been successfully detected and assayed by utilizing the above oxidation-decarboxylation-hydrolysis technique followed by reaction with fluorogenic reagent and measurement of the fluoroescence. This is the same order of sensitivity as for assay of primary amine-containing compounds previously described.

Surprisingly, it has been found that there is no interference in the measurement of fluorescence caused by by-products (e.g., aldehydes) and excess reagents present in the solution being assayed.

It should also be appreciated that the method of the present invention can be utilized to detect the presence of secondary α-amino acids on paper or thin-layer chromatographic systems. In such a technique, rather than operating completely in solution as described above, the various reagents are applied in sequence to the paper or thin-layer chromatographic system, preferably by spraying, and after the final treatment with the fluorogenic reagent, the paper or thin-layer chromatogram is examined under a fluorescent light source.

The present technique is suitably adapted for use in automated analysis of amino acid mixtures containing both primary and secondary α-amino acids. The amino acids are separated by a chromatographic column to produce a continuous sample stream containing the amino acids which elute in a known sequence and at a predetermined time. This stream is continually reacted to produce fluorescent material which is monitored by fluorometric techniques.

Thus, for example, in one procedure, the primary α-amino acids eluting from the chromatographic column are assayed as previously described by continuous reaction of the effluent stream, after pH adjustment, with fluorogen of Formula I. At the points where the secondary α-amino acids, notably proline and 4-hydroxyproline elute, the effluent stream, or a portion thereof, can be treated (most preferably in an automated fashion) by means of a shunt, with a source of active bromine or chlorine at acidic pH, then returned to the mainstream for pH adjustment and reaction with the fluorogenic reagent of Formula I. The fluorescence thus produced can be continuously monitored by means of the fluorophotometer.

In an alternative system, secondary α-amino acids can be assayed in the presence of primary α-amino acids, in which case all of the primary α-amino acids can be analyzed in the normal manner by one pass through the chromatographic column and fluorophotometer whereby the secondary α-amino acids will pass through undetected. A second pass through the column can then be made (or alternatively, a split stream from the first pass can be utilized) and the effluent stream or a portion thereof can be continually treated with the source of active bromine or chlorine at acidic pH followed by adjustment of the pH and reaction with the fluorogenic reagent of Formula I. The fluorescence produced is continually monitored. In this technique, as mentioned above, the primary α-amino acids from the second pass or split stream are degraded to ammonia and secondary α-amino acids such as proline and 4-hydroxyproline can be assayed by measurement of the fluorescence of the reaction products of the primary amines produced from their degradation. By use of either of the above techniques or others which are readily apparent to one skilled in the art, minute quantities of the naturally occuring primary and secondary α-amino acids can be efficiently monitored and their presence and concentration determined.

A further appreciation of the techniques involved in the practice of the present invention may be obtained from the following illustrative examples.

Example 1

To a 1 ml. aliquot of proline (0.4 to 4.0 nmole/ml) in pH 2 buffer was successively added, at 10 second intervals:

a. 1 ml of $4 \times 10^{-4}$ M aqueous N-chlorosuccinimide;
b. 1 ml of 2% sodium bicarbonate solution; and
c. 1 ml of $2 \times 10^{-3}$ M 4-phenylspiro [furan-2(3 H), 1'-phthalan]-3,3'-dione (compound I wherein R is hydrogen and R' is phenyl) in acetone.

Fluorescence was measured 2 minutes after addition of the last reagent (excitation 390 nm, emission 475 nm). The following data were obtained with relative fluorescence in arbitrary units (100 for the fluorescence obtained with 10 nmole/ml proline), corrected for blank. The column labelled "Concentration of proline" refers to the proline concentration of the sample divided by 4 (correction for the addition of 3 ml of reagents).

| Concentration of proline (nmole/ml) | Relative fluorescence |
|---|---|
| 0.1 | 1.2 |
| 0.2 | 2.0 |
| 0.4 | 4.0 |
| 0.6 | 6.2 |
| 0.8 | 7.8 |
| 1.0 | 10 |

Example 2

Following the procedure of Example 1, using 1 ml aliquots containing 4.0 to 40.0 nmole/ml proline there was obtained the following data:

| Concentration of Proline (nmole/ml) | Relative fluorescence |
|---|---|
| 1.0 | 10 |
| 2.0 | 21 |
| 4.0 | 40 |
| 5.0 | 48 |
| 6.0 | 58 |
| 8.0 | 80 |
| 10.0 | 100 |

Example 3

Following the procedure of Example 1, but substituting 1 ml aliquots containing 4.0 to 40.0 nmole/ml 4-hydroxyproline there was obtained the following data:

| Concentration of 4-hydroxyproline (nmole/ml) | Relative fluorescence |
|---|---|
| 1.0 | 4 |
| 2.0 | 9 |
| 3.0 | 13 |
| 4.0 | 17 |
| 5.0 | 21 |
| 6.0 | 26 |
| 7.0 | 31 |
| 8.0 | 35 |
| 9.0 | 39 |
| 10.0 | 43 |

Example 4

Following the procedure of Example 1, but substituting 1 ml. aliquots containing 4.0 to 40.0 nmole/ml sarcosine as substrate, and substituting 1 ml of $2 \times 10^{-3}$ M bromine water for the N-chlorosuccinimide, there was obtained the following data:

| Concentration of sarcosine (nmole/ml) | Relative fluorescence |
|---|---|
| 1.0 | 5 |
| 2.0 | 8 |
| 3.0 | 12 |
| 4.0 | 17 |
| 5.0 | 19 |
| 6.0 | 24 |
| 7.0 | 29 |
| 8.0 | 34 |
| 9.0 | 39 |
| 10.0 | 42 |

Example 5

The procedures of Examples 1–4 can be repeated, substituting for compound I wherein R is H and R' is phenyl, the following reagent of Formula I, wherein R and R' are:

| R | R' |
|---|---|
| hydrogen | 2-methoxyphenyl |
| do. | 3-methoxyphenyl |
| do. | 4-methoxyphenyl |
| do. | 2,4-dimethoxyphenyl |
| do. | 2,5-dimethoxyphenyl |
| do. | 3,5-dimethoxyphenyl |
| do. | 3,4,5-trimethoxyphenyl |
| do. | 2,4,5-trimethoxyphenyl |
| do. | 3,4-methylenedioxyphenyl |
| do. | 3-chlorophenyl |
| do. | 4-chlorophenyl |
| do. | 4-bromophenyl |
| do. | 3-indolyl |
| do. | 2-naphthyl |
| do. | 1-naphthyl |
| do. | n-propyl |
| methyl | phenyl |
| butyl | phenyl |
| methoxy | phenyl |
| chloro | phenyl |

Example 6

Varying amounts (2.5 to 10.0 µl) of a solution of 100 picomoles/µl proline in 0.01 M HCl (or in pH 2 buffer) were applied to a 2.7 mm × 50 cm column of Durrum DC-4A resin at 60° and eluted at about 7 cc/hr with 0.2 M citrate buffer, pH 3.28. To the effluent was continually added, at about 6 cc/hr, a solution of $10^{-4}$ M N-chlorosuccinimide in 0.025 M HCl. After passing through a short mixing coil, there was added to the above mixture, at about 20 cc/hr, 0.1 M borate buffer, pH 9.7. After passing through a short mixing coil the mixture, having a pH of 8.5, was treated with a solution of 150 mg/l 4-phenylspiro-[furan-2(3 H), 1'-phthalan]-3,3'-dione in acetone being added at a rate of approximately 20 cc/hr. After passing through a short mixing coil the solution was passed through a flow cell for continuous measurement of fluorescence (excitation 390 nm, emission 475 nm).

The total fluorescence produced by a given sample was directly proportional to the total amount of proline contained in the sample.

The above procedure can be repeated utilizing samples containing 4-hydroxyproline.

We claim:

1. A method for determining a secondary α-amino acid which method comprises
   a. contacting said secondary α-amino acid with a source of active chlorine or bromine at a pH between about 1 and 4 in an aqueous medium whereby the secondary amino acid is degraded to a primary amine;

b. adjusting the pH to between about 6 and 11;
c. contacting with a fluorogenic reagent of the formula

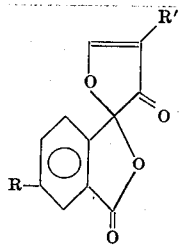

wherein R is hydrogen, halogen, lower alkyl or lower alkoxy and R' is lower alkyl or aryl
to produce fluorescent material; and
d. detecting said fluorescence.

2. The method of claim 1 wherein R is hydrogen and R' is phenyl.

3. The method of claim 1 wherein the source of active chlorine is N-chlorosuccinimide.

4. The method of claim 1 wherein the source of active bromine is N-bromosuccinimide.

5. The method of claim 1 wherein the source of active bromine is bromine.

6. The method of claim 1 wherein the pH in step a is about 2.

7. The method of claim 1 wherein the temperature is between about 0° and +30°C.

8. The method of claim 1 wherein the pH of the aqueous medium in step b is between about 7.5 and 9.5.

9. The method of claim 1 wherein, in step a, an excess of from about 100 to 1000-fold of active chlorine or bromine source is utilized relative to secondary α-amino acid.

10. The method of claim 1 wherein, in step c, an excess of fluorogenic reagent is employed.

11. The method of claim 1 wherein the secondary α-amino acid is cyclic.

12. The method of claim 11 wherein the cyclic secondary α-amino acid is proline.

13. The method of claim 11 wherein the cyclic secondary α-amino acid is 4-hydroxyproline.

14. A method for the determination of a secondary α-amino acid in an aqueous sample stream containing same which method comprises:
 a. continuously contacting said sample stream with an excess of a source of active chlorine or bromine at a pH between about 1 and 4 whereby the secondary amino acid is degraded to a primary amine;
 b. continuously adjusting the pH of the sample stream produced in step a to between about 6 and 11;
 c. continuously contacting the sample stream produced in step b with an excess of a compound of the formula

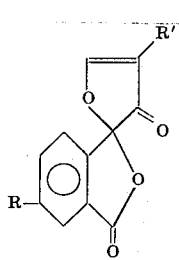

wherein R is hydrogen, halogen, lower alkyl or lower alkoxy and R' is lower alkyl or aryl to produce a sample stream containing fluorescent material; and
 d. continuously passing the sample stream produced in step c through a flow cell of a fluorophotometer whereby fluorescent material present is fluoresced and detected.

15. The method of claim 14 wherein the sample stream used in step a is at least a portion of the effluent of a chromatographic column.

16. The method of claim 14 wherein the source of active chlorine is an aqueous solution of N-chlorosuccinimide.

17. The method of claim 14 wherein said sample stream used in step a contains a primary α-amino acid.

18. The method of claim 14 wherein the pH in step a is about 2.

19. The method of claim 14 wherein the pH in step b is adjusted to between about 7.5 and 9.5.

20. A method for the determination of amino acids in a mixture containing a primary α-amino acid and a secondary α-amino acid which comprises:
 a. separating said amino acids from one another by means of a selective adsorption column so that the amino acids elute from said column in a known sequence and at a predetermined time as part of a continuous aqueous sample stream;
 b. at those times when said sample stream contains a secondary α-amino acid, continuously contacting said sample stream, or a portion thereof, with an excess of a source of active chlorine or bromine at a pH between about 1 and 4 whereby the secondary amino acid is degraded to a primary amine;
 c. continuously adjusting the pH of the sample stream from step b, or, at those times when the sample stream from step a does not contain a secondary amino acid, continuously adjusting the pH of this sample stream or a portion thereof, to between about 6 and 11;
 d. continuously contacting the sample stream from step c with an excess of a compound of the formula

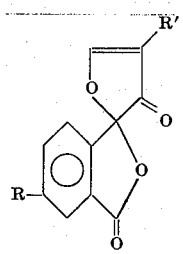

wherein R is hydrogen, halogen, lower alkyl or lower alkoxy and R' is lower alkyl or aryl to produce a sample stream containing fluorescent material; and
 e. continuously passing the sample stream produced in step d through a flow cell of a fluorophotometer whereby fluorescent material present is fluoresced and detected.

21. The method of claim 20 wherein the secondary α-amino acid is proline or 4-hydroxyproline.

22. The method of claim 20 wherein the pH in step b is about 2.

23. The method of claim 20 wherein the pH in step c is adjusted to between about 7.5 and 9.5.

* * * * *